United States Patent
Naito et al.

(10) Patent No.: US 8,744,187 B2
(45) Date of Patent: Jun. 3, 2014

(54) IMAGE IDENTIFICATION APPARATUS AND METHOD

(75) Inventors: Hidehiro Naito, Shizuoka-ken (JP); Hitoshi Iizaka, Shizuoka-ken (JP); Yoshiya Yamada, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/448,561

(22) Filed: Apr. 17, 2012

(65) Prior Publication Data

US 2012/0294479 A1 Nov. 22, 2012

(30) Foreign Application Priority Data

May 16, 2011 (JP) .................................. 2011-109749

(51) Int. Cl.
*G06K 9/00* (2006.01)

(52) U.S. Cl.
USPC .......................................... 382/181; 235/473

(58) Field of Classification Search
USPC .......................................... 382/181; 235/473
See application file for complete search history.

(56) References Cited

U.S. PATENT DOCUMENTS

| 5,600,116 | A | * | 2/1997 | Seo et al. ....................... 235/455 |
| 2006/0163355 | A1 | | 7/2006 | Olmstead et al. |
| 2007/0090193 | A1 | * | 4/2007 | Nunnink et al. ............... 235/473 |
| 2012/0067957 | A1 | * | 3/2012 | Nakamura et al. ............ 235/455 |

FOREIGN PATENT DOCUMENTS

| JP | 62-150486 | 7/1987 |
| JP | 11-120284 | 4/1999 |
| JP | 2008-511917 | 4/2008 |
| JP | 2009-020611 | 1/2009 |
| JP | 2010-152602 | 7/2010 |

OTHER PUBLICATIONS

English Translation of Office Action of Notice of Rejection for Japanese Patent Application No. 2011-109749 Dated May 21, 2103, 6 pgs.

* cited by examiner

*Primary Examiner* — Tom Y Lu
(74) *Attorney, Agent, or Firm* — Amin, Turocy & Watson, LLP (57) ABSTRACT

According to one embodiment, an image identification apparatus comprises an image pickup unit, an illumination unit, an illumination control unit and an identification unit. The image pickup unit configured to pickup an image of an identified object. The illumination unit configured to irradiate light towards the image pickup area of the image pickup unit. The illumination control unit configured to change the irradiation condition of the illumination unit in accordance with the image pickup timing of the image pickup unit. The identification unit configured to identify the identified object according to the image picked-up by the image pickup unit.

2 Claims, 9 Drawing Sheets

BLOWN-OUT HIGHLIGHTS

IMAGE IDENTIFICATION APPARATUS AND METHOD

CROSS-REFERENCE TO RELATED APPLICATION

This application is based upon and claims the benefit of priority from Japanese Patent Application No. 2011-109749, filed May 16, 2011, the entire contents of which are incorporated herein by reference.

FIELD

Embodiments described herein relate to an image identification apparatus and method.

BACKGROUND

In the past, in an image identification apparatus in which a CCD (Charge Coupled Device Image Sensor) image pickup element pickups the image of a code symbol (identified object) using an are an image sensor to output a commodity code, in order to guarantee the brightness needed for the image pickup, light is sometimes irradiated from a light source to the code symbol.

BRIEF DESCRIPTION OF THE DRAWINGS

FIG. 9 is a front view of the illumination unit according to the first embodiment, (a) is a front view of the illumination unit showing the state of the first to sixth LEDs are turned on, (b) is a front view of the illumination unit showing the state of the third to eighth LEDs are turned on;

FIG. 10 is a front view of the illumination unit according to the first embodiment, (a) is a front view of the state of the first to fourth LEDs are turned on, (b) is a front view of the state of the fifth to eighth LEDs are turned on;

FIG. 11 is a front view of the illumination unit according to the first embodiment, (a) is a front view of the state of the first to second LEDs are turned on, (b) is a front view of the state of the seventh to eighth LEDs are turned on;

DETAILED DESCRIPTION

According to one embodiment, an image identification apparatus comprises an image pickup unit, an illumination unit, an illumination control unit and an identification unit. The image pickup unit configured to pickup an image of an identified object. The illumination unit configured to irradiate light towards the image pickup area of the image pickup unit. The illumination control unit configured to change the irradiation condition of the illumination unit in accordance with the image pickup timing of the image pickup unit. The identification unit configured to identify the identified object according to the image picked-up by the image pickup unit.

According to one embodiment, an image identification method in an image identification apparatus having an image pickup unit configured to pickup an image of an identified object, an illumination unit configured to irradiate light towards the image pickup area of the image pickup unit and an identification unit configured to identify the identified object according to the image picked-up by the image pickup unit, comprising: changing an irradiation condition of the illumination unit in accordance with the image pickup timing of the image pickup unit.

Embodiments are described in detail below with reference to accompanying drawings. In addition, identical components contained in the following several embodiments are identified by the same reference symbols hereinafter and are not described repeatedly.

The First Embodiment

Figure 1:
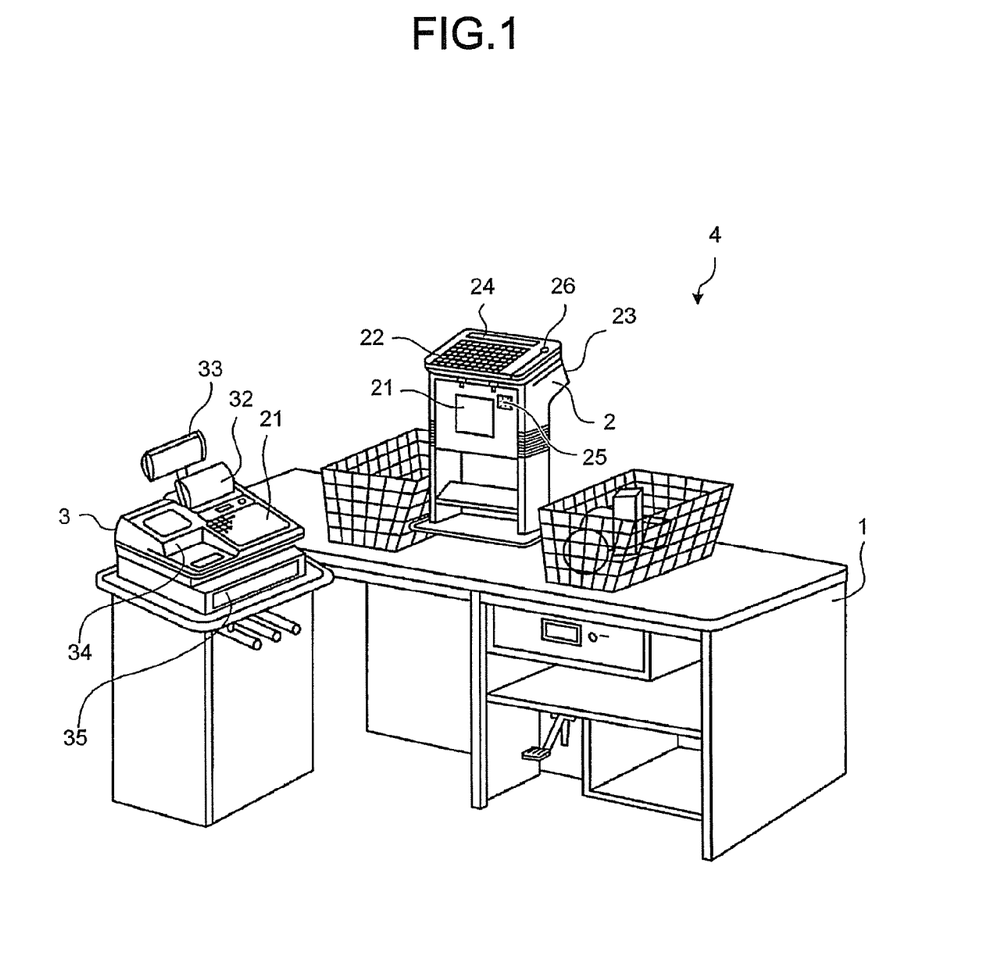
FIG. 1 is an external perspective view roughly showing the components of a checkout lane system provided with an image identification apparatus according to a first embodiment.

The first embodiment is described first. FIG. 1 is an external perspective view roughly showing the components of a checkout lane system provided with an image identification apparatus according to a first embodiment. As shown in FIG. 1, a checkout lane system 4 comprises: a sucker table 1 configured to hold a commodity-containing shopping basket; an image identification apparatus 2 vertically configured at the substantially center position of the sucker table 1; and a POS terminal 3 that is connected with the image identification apparatus 2 by a transmission path (not shown) in a mutually communicable manner.

The POS terminal 3 registers the sales of the commodity purchased by a customer. As shown in FIG. 1, a keyboard 31, an operator-side display 32, a customer-side display 33, a printer 34 for printing invoices and the like and a cash drawer 35 for accommodating cash are configured on the POS terminal 3. A closing key for the account settlement of commodities is configured on the keyboard 31. The POS terminal 3 has the same structure and functions with the standard POS terminal used in such a checkout lane system.

The image identification apparatus 2 is an apparatus (image reading apparatus) for reading the barcode adhered on a commodity as an identified object and outputting the commodity information contained in the barcode to the POS terminal 3. As shown in FIG. 1, the image identification apparatus 2 mainly comprises a reading window 21, a keyboard 22, a first display 23, a second display 24, a buzzer 25 and an LED 26.

In the case where a commodity cannot be registered using a barcode, the input of various keys is accepted by the keyboard 22. The first display 23 is configured to display the name and the price of a registered commodity for a customer or shop assistant. The second display 24 is configured to display the name and the price of a registered commodity as well as other error information for an operating shop assistant.

An image pickup element 203 (referring to FIG. 2) is built in the image identification apparatus 2 provided with the reading window 21. The image pickup element 203, which may be, for example, a image pickup device using a CCD (Charge Coupled Device) or CMOS (Complementary Metal Oxide Semiconductor) or the like, pickups the image of a barcode placed in a image pickup area opposite to the reading window 21.

Figure 2:
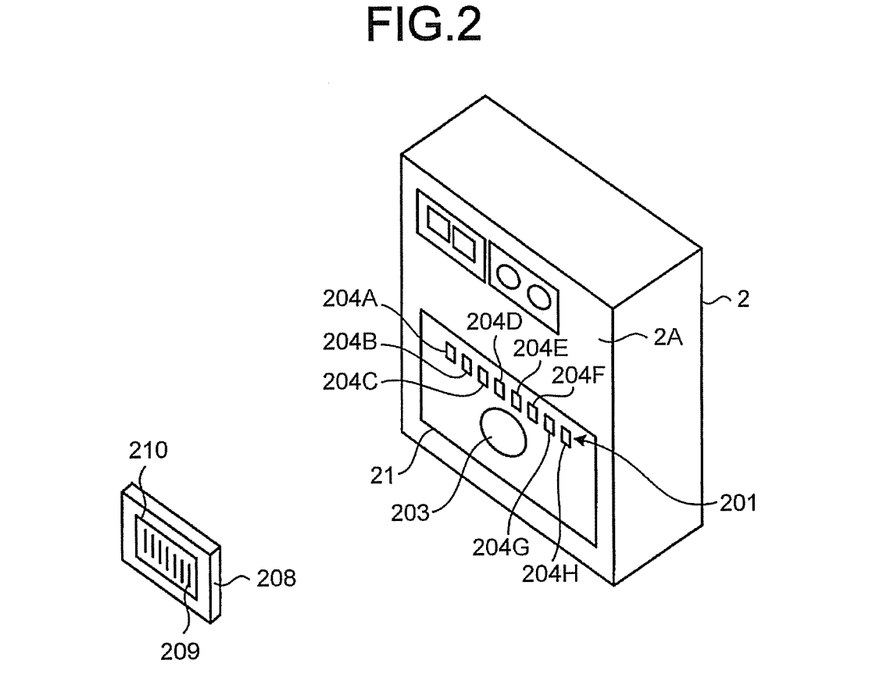
FIG. 2 is an external perspective view roughly showing the components of the image identification apparatus according to the first embodiment.

FIG. 2 is an external perspective view roughly showing the components of the image identification apparatus according to the first embodiment. As shown in FIG. 2, an image identification apparatus 2 has an image pickup element 203 and an illumination unit 201 on the front surface 2a thereof. A commodity 208 is placed opposite to the front surface 2a of the image identification apparatus 2 by an operator. A piece of paper 210, on which a barcode 209 is printed, is adhered on the commodity 208. When reading the barcode 209 with the image identification apparatus 2, the operator manually adjusts the barcode 209 printed on the paper 210 adhered on the commodity 208 into the image pickup area of the image pickup element 203. Moreover, although this embodiment is described by taking a code symbol, that is, the barcode 209, as the object identified by the image identification apparatus 2, the present invention is not limited to this, the identified object may be a two-dimensional code or the commodity itself.

The image pickup element 203 receives reflected light from a commodity 208 which is located on the front surface 2a of the image identification apparatus 2 and contains the image of the barcode 209 (namely, the barcode 209) and on which the paper 210 printed with the barcode 209 is adhered and converts the light reflected from the commodity 208 to an electric information to output the image information of the commodity 208. Moreover, in this embodiment, the image pickup element 203 outputs XGA (Extended Graphics Array) image information having a resolution of 1024*768 pixels.

Figure 3:
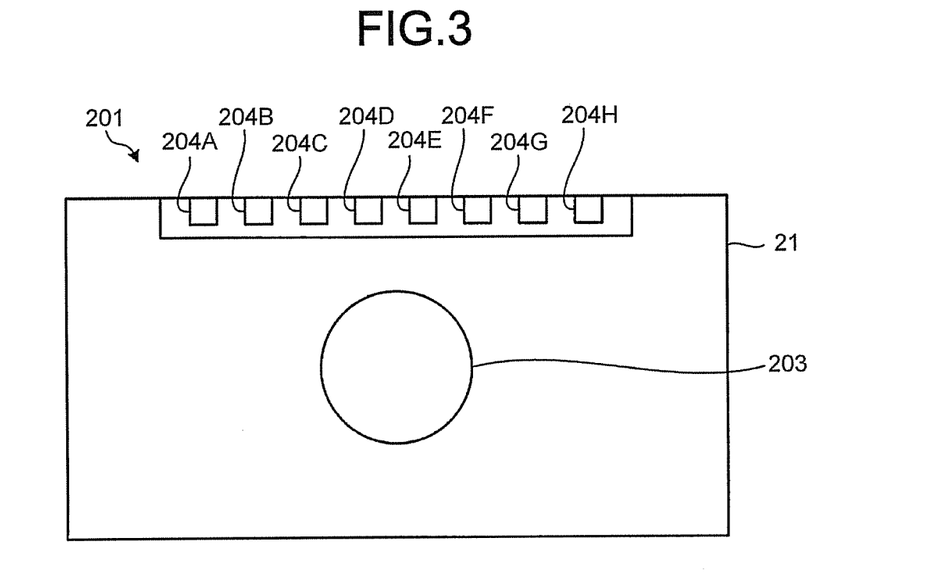
FIG. 3 is a front view of an illumination unit and the like of the image identification apparatus according to the first embodiment.

The illumination unit 201 irradiates light towards the image pickup area of the image pickup unit 203. FIG. 3 is a front view of an illumination unit and the like of the image identification apparatus according to the first embodiment. As shown in FIG. 3, an illumination unit 201 comprises 8 LEDs 204 that serve as light sources, Specifically, the 8 LEDs 204 consist of a first LED 204a, a second LED 204b, a third LED 204c, a fourth LED 204d, a fifth LED 204e, a sixth LED 204f, a seventh LED 204g and an eighth LED 204h. The LEDs 204a-204h are each configured at different positions and are configured above the image pickup element 203 in a line along the width direction (from left to right) of the image identification apparatus 2. The LEDs 204a-204h irradiate light towards the front side of the image identification apparatus 2, thereby irradiating light into the image pickup area of the image pickup element 203. Moreover, each of the LEDs 204a-204h is sometimes merely described as an LED 204 in the description that follows. The light irradiation range of the illumination unit 201 is substantially as large as or larger than the image pickup area of the image pickup element 203. Moreover, in this embodiment, the illumination unit 201 is synchronous in time with the image pickup element in order to irradiate light for a given time. That is, the illumination unit 201 irradiates light for a given time in accordance with the image pickup timing of the image pickup element 203.

In this way, the illumination unit 201 contains the plurality of LEDs 204 configured at separate positions to serve as light sources. In the illumination unit 201, the outgoing position of light can be changed by changing the one of the plurality of LEDs 204 that is turned on. The outgoing position of light, which refers to the position of the LED 204 which turns on, is included in the irradiation condition of the illumination unit 201.

Figure 4:
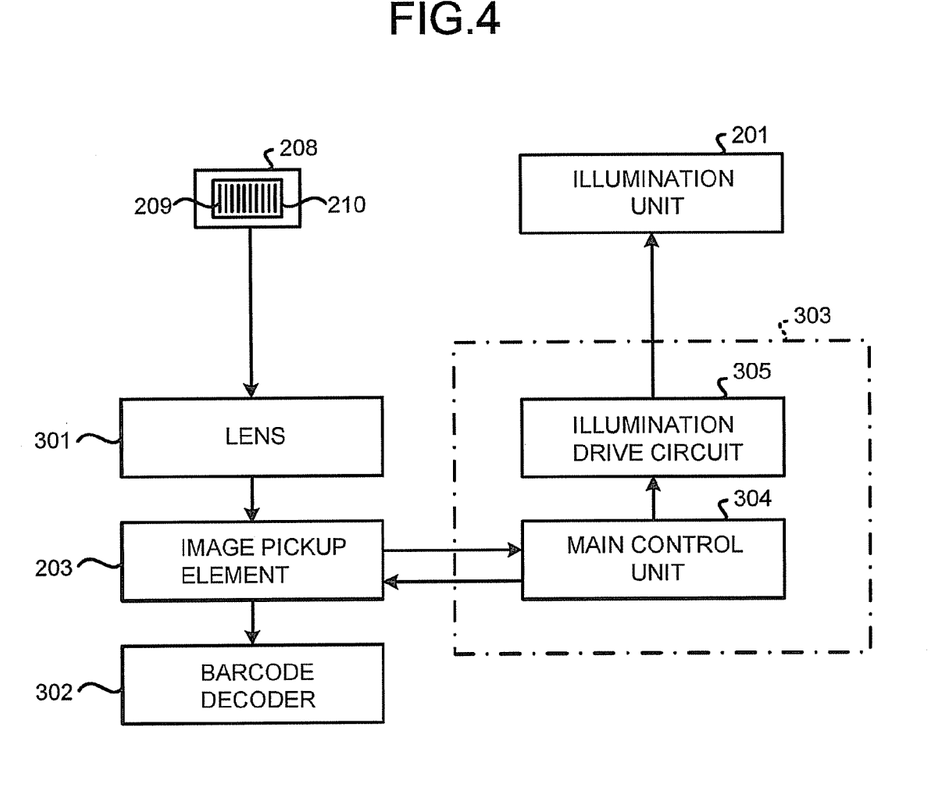
FIG. 4 is a block diagram showing the components of the image identification apparatus according to the first embodiment.

FIG. 4 is a block diagram showing the components of the image identification apparatus according to the first embodiment. A lens 301 is configured in the image identification apparatus 2. The image pickup element 203 pickups the image imaged on the lens 301 by inputting the image of the commodity 208 imaged on the lens 301 according to a strobe signal input in a given time interval (e.g. 1/30 (second)) and outputs image information.

A barcode decoder 302 connected with the image pickup element 203 acquires the image information output from the image pickup element 203, extracts the image of the barcode 209 contained in the acquired image information, and reads the commodity information related to the commodity 208 from the extracted image of the barcode 209 and carries out an identification. The barcode decoder 302 is equivalent to an identification unit in this embodiment.

The control unit 303, which controls the image pickup of the image pickup element 203 and the light irradiation of the lighting unit 201, comprises a main control unit 304 and an illumination drive circuit 305. The main control unit 304 comprises a CPU (Central Processing Unit), an RAM (Random Access Memory), an ROM (Read Only Memory) and an I/O port. The main control unit 304 is further connected with the image pickup element 203 and the illumination drive circuit 305 to control the actions of the image pickup element 203 and the illumination drive circuit 305. Specifically, the main control unit 304 outputs the strobe signal indicating an image pickup to the image pickup element 203 at a given time interval to control the image pickup of the image pickup element 203. Moreover, the main control unit 304 outputs a light control signal indicating a light irradiation to the illumination drive circuit 305 to control the light irradiation of the illumination unit 201 through the illumination drive circuit 305. The illumination drive circuit 305 irradiates light from the illumination unit 201 according to the light control signal output from the main control unit 304.

Figure 5:
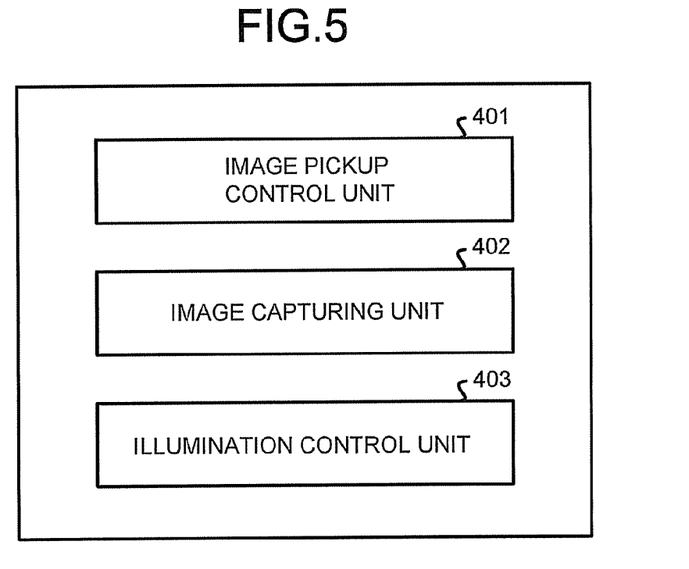
FIG. 5 is a block diagram showing the functional components of the image identification apparatus according to the first embodiment.

Next, the functional components of the image identification apparatus 2 achieved by a program execution of the CPU of the main control unit 304 are described below. FIG. 5 is a block diagram showing the functional components of the image identification apparatus according to the first embodiment. The CPU of the main control unit 304 acts according to the program stored in the ROM developed on the RAM, thereby functioning as a image pickup control unit 401, an image capturing unit 402 and a light source control unit 403, as shown in FIG. 5.

The image pickup control unit 401 outputs, in synchronization with the trailing edge of an HD (horizontal drive) signal generated by an external circuit, the strobe signal to the image pickup element 203 to control the image pickup of the image pickup element 203.

The image capturing unit 402 acquires, in synchronization with the HD signal or VD (Vertical Drive) signal generated by an external circuit, the image picked-up by the image pickup element 203. Specifically, the image capturing unit 402 starts to acquire a frame of image from the image pickup element 203 in synchronization with the trailing edge of the VD signal. When acquiring an image from the image pickup element 203, the image capturing unit 402 acquires, in synchronization with the trailing edge of the HD signal, the images by taking a line as a unit. As in this embodiment the image pickup element 203 pickups images having a resolution of 1024*768 pixels, the image capturing unit 402 acquires at least 768 lines (e.g. 791 lines) of images in synchronization with the trailing edge of the HD signal. Moreover, when acquiring a line of image, the image capturing unit 402 acquires an image of 1270 pixels in synchronization with a clock signal which input between the leading edge and the trailing edge of the HD signal (at least the interval of 1024 (e.g. 1270) pixels).

The illumination control unit 403 outputs, at least partially synchronous with the strobe signal output time of the image pickup control unit 401 (that is, the image pickup period of the image pickup element 203), a light control signal to the illumination drive circuit 305 to control the light irradiation of the illumination unit 201. That is, the illumination control unit 403 enables the illumination unit 201 to irradiate light for a given time in accordance with the image pickup timing of the image pickup element 203.

Figure 6:
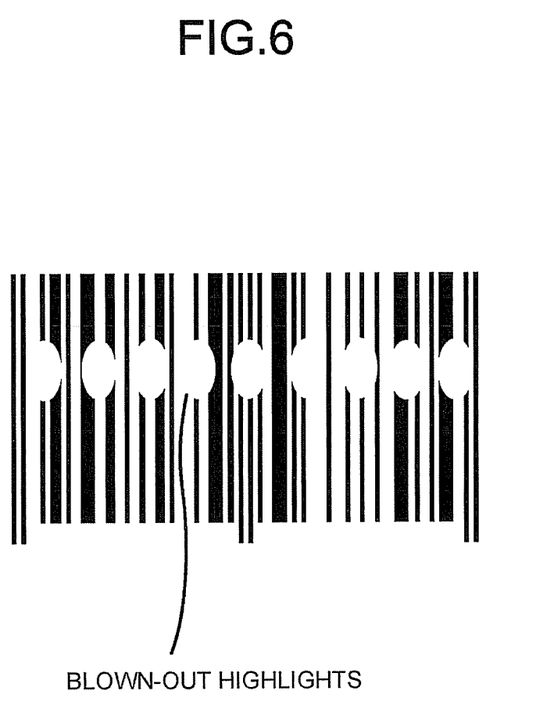
FIG. 6 shows an image occurred blown-out highlights according to the first embodiment.

Further, the illumination control unit 403 may change the illumination condition of the illumination unit 201 in accordance with (in synchronization with) the image pickup timing of the image pickup element 201. In this embodiment, the irradiation condition of the illumination condition 201 refers to the light outgoing position of the illumination unit 201 that can be changed by the illumination control unit 403. The illumination control unit 403 changes the irradiation condition of the illumination condition 201 by changing the LED 204 that turn on. At this time, after a frame of image is acquired by the image capturing unit 402, the illumination control unit 403 carries out a blown-out highlight determination to determine whether or not there are blown-out highlights in the identification result of the acquired image. The identification result here is a result from an identification carried out on the image picked-up by the image pickup element 201 (that is, the image acquired by the image capturing unit 402) using the illumination control unit 403. The blown-out highlights herein refer to a phenomenon that a bright part in an image having a brightness higher than a given one becomes a pure white part, as shown in FIG. 6. In the course of a blown-out highlight determination, the illumination control unit 403 first carries out an image identification after acquiring a frame of image with the image capturing unit 402 to count the white image pixels (the brightness of each color of RGB is above 250) contained in the acquired image. Moreover, the illumination control unit 403 determines that blown-out highlights occur in the image picked-up by the image pickup element 203 if the number of the white image pixels (pixel number) is greater than a given number (a given pixel number), which may be, for example, 1/64 or 1/4 of 1024*768 pixels.

Further, after determining the occurrence of blown-out highlights in the image acquired by the image capturing unit 402 on condition that the occurrence of blown-out highlights in the identification result of the same image is determined, the illumination control unit 403 carries out a light outgoing position changing processing (irradiation condition changing processing) to change the light outgoing position of the illumination unit 201. During the light outgoing changing processing, the illumination control unit 403 changes the LED 204 that turn on to change the light outgoing position of the illumination condition 201. Specifically, after turning on all the LEDs 204 (eight), the illumination control unit 402 reduces the number of the LEDs 204 that give off light. More specifically, after turning on all the LEDs 204 (eight), the illumination control unit 402 reduces the number of the LEDs 204 that give off light to be 6, 4 or 2. In this case where the number of the LEDs 204 is reduced, the illumination control unit 403 further changes the LEDs 204 to be turned on. On the other hand, if it is determined that no blown-out highlights occur in the image, the illumination control unit 403 makes no change in the light outgoing position of the illumination unit 201, that is, turns on all the LEDs 204.

Figure 7:
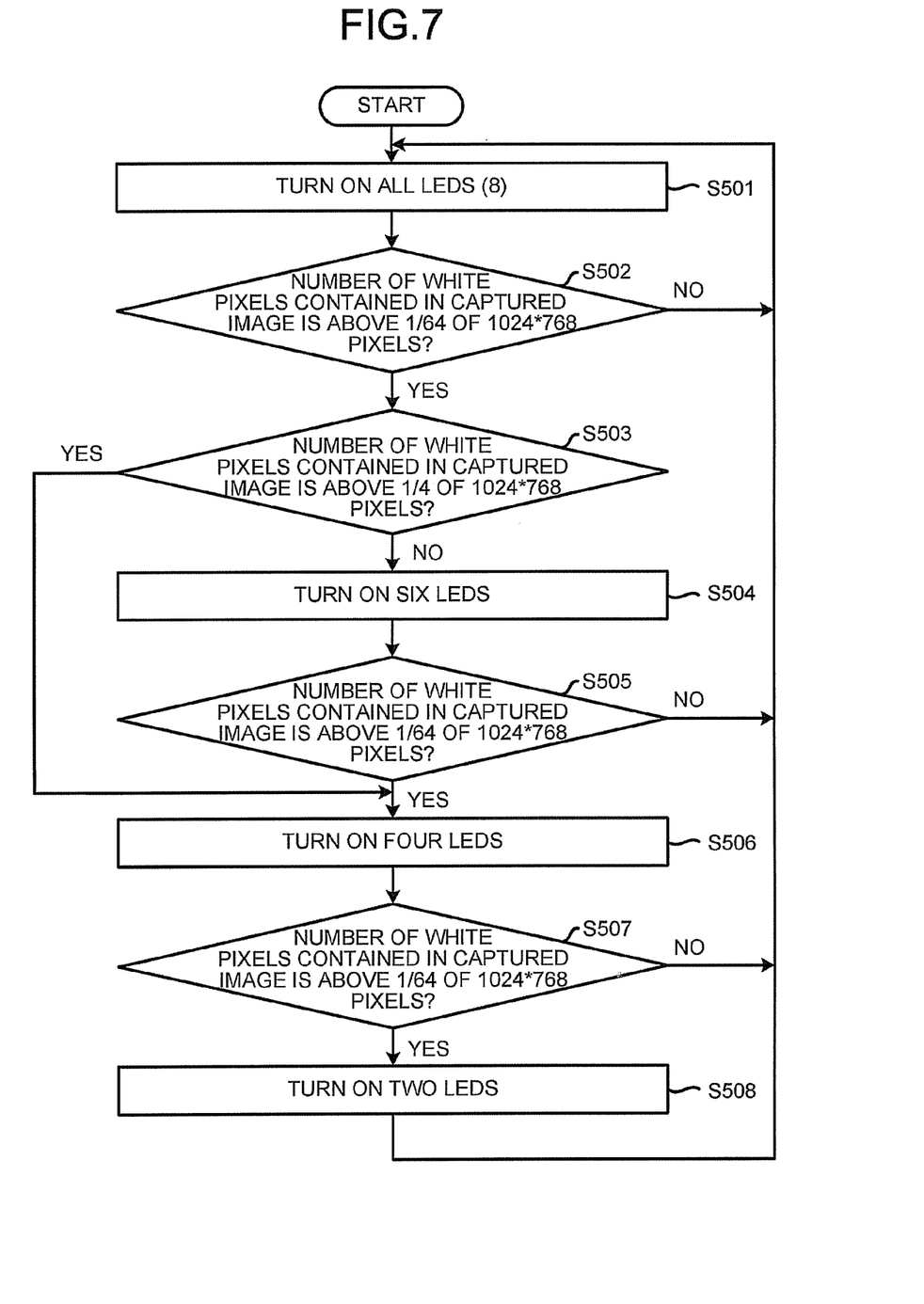
FIG. 7 is a flow chart showing an illumination control flow according to the first embodiment.

Next, the illumination control processing carried out by the main control unit 304 in accordance with a program is described with reference to the flow chart shown in FIG. 7.

Figure 8:
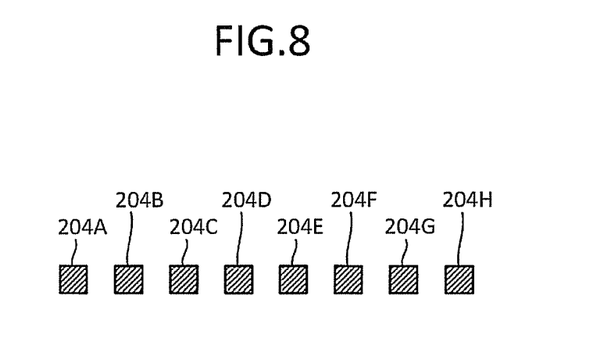
FIG. 8 is a front view of the illumination unit showing the state of every LED (Light Emitting Diode) is turned on according to the first embodiment.

First, the illumination control unit 403 turns on all the LEDs (eight pieces) (Act S501). FIG. 8 shows the states of the LEDs 204 in the case. Further, a turned on LED 204 is identified with shadow lines in FIG. 8. When the LEDs are in the turned on state, the image pickup control unit 401 controls the image pickup of the image pickup element 203, and after the image capturing unit 402 acquires a frame of image, the illumination control unit 403 determines whether or not the number of the white image pixels contained in the acquired image exceeds 1/64 of 1024*768 pixels (Act S502). The illumination control unit 403 returns to execute Act 501 after determining the number of the white image pixels contained in the acquired image is less than 1/64 of 1024*768 pixels (S502: No).

Figure 9:
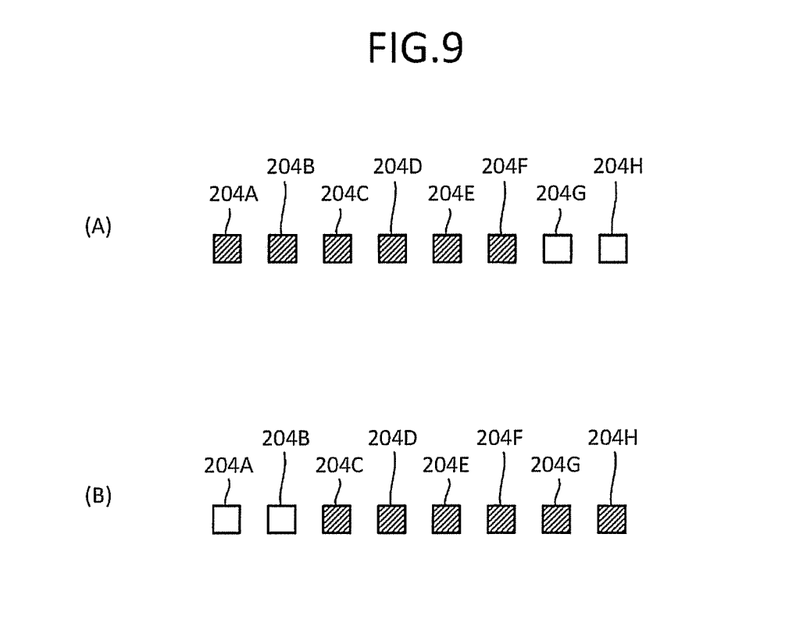

On the other hand, the illumination control unit 403 continues to determine whether or not the number of the white image pixels contained in the acquired image is greater than 1/4 of 1024*768 pixels (Act S503) after determining the number of the white image pixels contained in the acquired image is above 1/64 of 1024*768 pixels (S502: Yes). After determining the number of the white image pixels contained in the acquired image is less than 1/4 of 1024*768 pixels (S503: No), the illumination control unit 403 turns on six LEDs 204 (Act S504) and keeps the other two LEDs 204 turned off, that is, reduce the number of the turned on LEDs 204 after turning on all the LEDs 204. FIG. 9(a) shows the states of the LEDs in this case. In the example shown in FIG. 9(a), the first to sixth LEDs 204a-204f are turned on, while the seventh and eighth LEDs 204g and 204h are turned off. The illumination control unit 403 further changes turned on LEDs 204 after the number of turned on LEDs 204 is reduced, that is, the illumination control unit 403 continues to change six turned on LEDs 204 after the number of turned on LEDs 204 is decreased from 8 to 6. The LEDs 204 to be changed may be determined in advance or randomly. FIG. 9(b) shows the states of the LEDs in this case. In the example shown in FIG. 9(b), the third to eighth LEDs 204c-204h are turned on, while the first and second LEDs 204a and 204b are turned off. Moreover, the turned on LEDs may be changed for many times but not limited to one time.

Further, when the LEDs are in the turned on state described in Act S504, the image pickup control unit 401 controls the image pickup of the image pickup element 203, after the image capturing unit 402 acquires a frame of image, the illumination control unit 403 determines whether or not the number of the white image pixels contained in the acquired image exceeds 1/64 of 1024*768 pixels (Act S505). Further, the illumination control unit 403 returns to execute Act 501 after determining the number of the white image pixels contained in the acquired image is less than 1/64 of 1024*768 pixels (S505: No).

Figure 10:
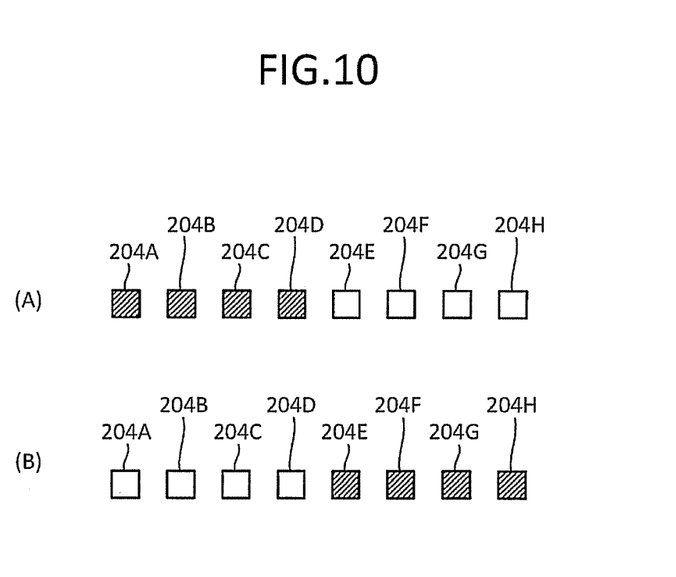

On the other hand, the illumination control unit 403 only turns on four LEDs 204 (Act S506) and keeps the other four LEDs turned off if it is determined in Act S503 that the number of the white image pixels contained in the acquired image is greater than 1/4 of 1024*768 pixels (S503: Yes) or it is determined in Act S505 that the number of the white image pixels contained in the acquired image is above 1/64 of 1024*768 pixels (S505: Yes). FIG. 10(a) shows the states of the LEDs in this case. In the example shown in FIG. 10(a), the first to fourth LEDs 204a-204d are turned on, while the fifth to eighth LEDs 204e-204h are turned off. The illumination control unit 403 further changes turned on LEDs 204 after the number of turned on LEDs 204 is reduced. That is, the illumination control unit 403 continues to change four turned on LEDs 204 after the number of turned on LEDs 204 is decreased to 4. The LEDs 204 to be changed may be determined in advance or randomly. FIG. 10(a) shows the states of the LEDs in this case. In the example shown in FIG. 10(b), the fifth to eighth LEDs 204e-204h are turned on, while the first and fourth LEDs 204a and 204d are turned off. Moreover, the turned on LEDs may be changed for many times but not limited to one time.

Further, when the LEDs are in the turned on state described in Act S506, the image pickup control unit 401 controls the image pickup of the image pickup element 203, after the image capturing unit 402 acquires a frame of image, the illumination control unit 403 determines whether or not the number of the white image pixels contained in the acquired image exceeds 1/64 of 1024*768 pixels (Act S507). Further, the illumination control unit 403 returns to execute Act 501 after determining the number of the white image pixels contained in the acquired image is less than 1/64 of 1024*768 pixels (S507: No).

Figure 11:
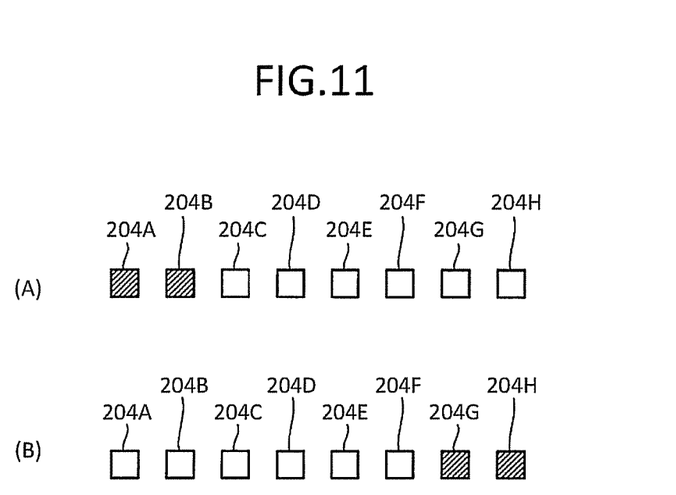

On the other hand, after determining the number of the white image pixels contained in the acquired image is more than 1/64 of 1024*768 pixels (S507: Yes), the illumination control unit 403 only turns on 2 LEDs 204 (Act S508) and keeps the other six LEDs 204 turned off. FIG. 11(a) shows the states of the LEDs in this case. In the example shown in FIG. 11(a), the first and second LEDs 204a-204b are turned on, while the third to eighth LEDs 204c-204h are turned off. The illumination control unit 403 further changes turned on LEDs 204 after the number of the turned on LEDs 204 is reduced. That is, the illumination control unit 403 continues to change two turned on LEDs 204 after the number of turned on LEDs 204 is decreased to 2. The LEDs 204 to be changed may be determined in advance or randomly. FIG. 11(a) shows the states of the LEDs in this case. In the example shown in FIG. 11(b), the seventh and eighth LEDs 204g-204h are turned on, while the first to sixth LEDs 204a-204f are turned off. Moreover, the turned on LEDs may be changed for many times but not limited to one time. When the LEDs are in the turned on state described in Act S508, the image pickup control unit controls the image pickup of the image pickup element 203, and the image capturing unit 402 acquires a frame of the image. Then, the acts following Act S501 are executed repeatedly.

As stated above, in this embodiment, the illumination control unit 403 changes the outgoing position of light according to the irradiation condition of the illumination unit 201. Therefore, blown-out highlights occur occasionally, depending upon the relationship between the position and gesture of the picked-up object and the outgoing position of light. Thus, even the image picked-up by the image pickup element 203 when light is irradiated from an outgoing position is subjected to blow out highlights, the image picked-up by the image pickup element 203 at another outgoing position is free from blow out highlights. Moreover, blown-out highlights sometimes occur at a different position as the outgoing position is changed. That is, the illumination control unit 403 can inhibit the occurrence or change the position of blown-out highlights by changing the light outgoing position of the illumination unit 201 so as to inhibit the occurrence of blown-out highlights in the barcode 209 of the image. As a consequence, a defective picked-up image of the barcode 209 is prevented.

Moreover, in this embodiment, the illumination control unit 403 changes the light outgoing position (irradiation condition) of the illumination unit 201 after determining the occurrence of blown-out highlights in the image, thus, a defective picked-up image of the barcode 209 is effectively prevented.

Moreover, in this embodiment, the illumination control unit 403 changes the light outgoing position by changing turned on LEDs 204, therefore, the light outgoing position can be instantaneously changed.

Further, in this embodiment, the illumination control unit 403 reduces the number of turned on LEDs 204 after turning on all of the LEDs 204. Therefore, the light outgoing position can be changed instantaneously. Moreover, the occurrence of blown-out highlights is prevented as the amount of light is reduced due to the reduction in the number of turned on LEDs 204.

Further, in this embodiment, the illumination control unit 403 continues to change turned on LEDs 204 after the number of the turned on LEDs 204 is reduced. Therefore, when the number of the turned on LEDs 204 is reduced to a given number (herein being 2, 4, 6), the light outgoing position can be changed while the amount of light is kept unchanged.

The Second Embodiment

Next, the second embodiment is described which is different from the first embodiment in the illumination unit 201 and the illumination control processing.

Figure 12:
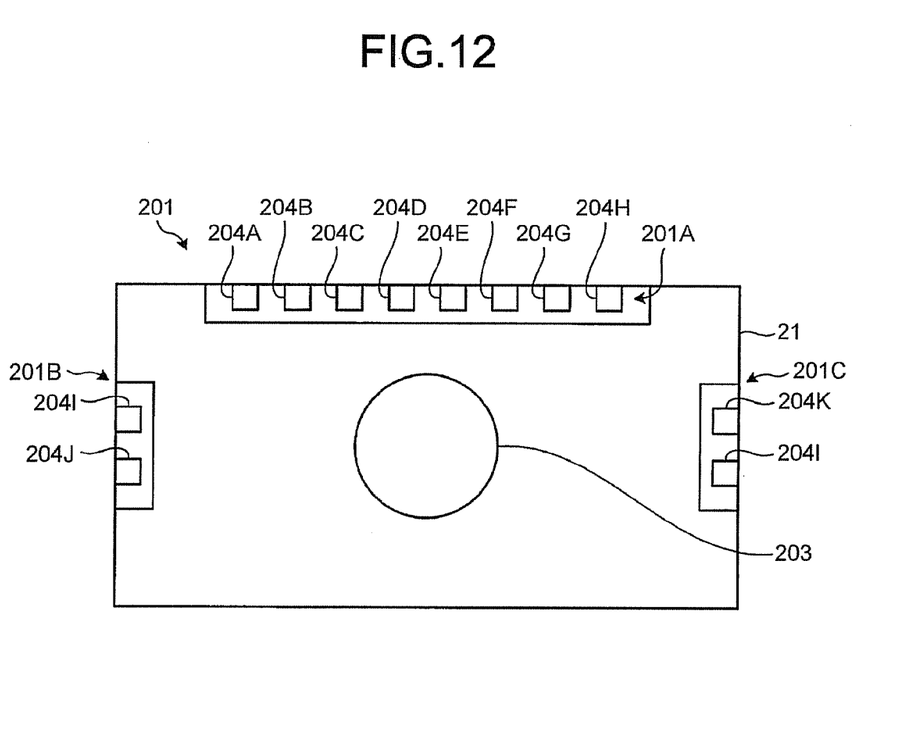
FIG. 12 is a front view of the illumination unit of the image identification apparatus according to the second embodiment.

FIG. 12 is a front view of the illumination unit of the image identification apparatus according to the second embodiment. As shown in FIG. 12, an illumination unit 201 comprises an upper light source unit 201a, a left light source unit 201b and a right light source unit 201c.

The upper light source unit 201a is configured above the image pickup element 202 and includes the first to eighth LEDs 204a-204h described in the first embodiment. The left light source unit 201b is configured at one side (left side) of the image pickup element 203 and includes a ninth LED 204i and a tenth LED 204j which are configured in the vertical direction. The right light source unit 201c is configured at the other side (right side) of the image pickup element 203 and includes an eleventh LED 204k and a twelfth LED 204l which are configured in the vertical direction. The first to twelfth LED 204a-204l irradiate light towards the front side of the image identification apparatus 2, thereby irradiating light into the image pickup area of the image pickup element 203.

Figure 13:
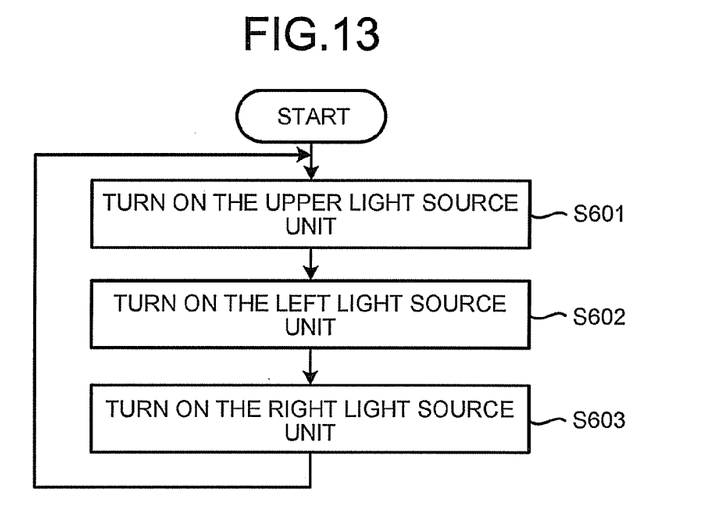
FIG. 13 is a flow chart showing the illumination control processing flow according to the second embodiment.

Next, the illumination control processing carried out by the main control unit 304 in accordance with a program is described with reference to the flow chart shown in FIG. 13.

Figure 14:
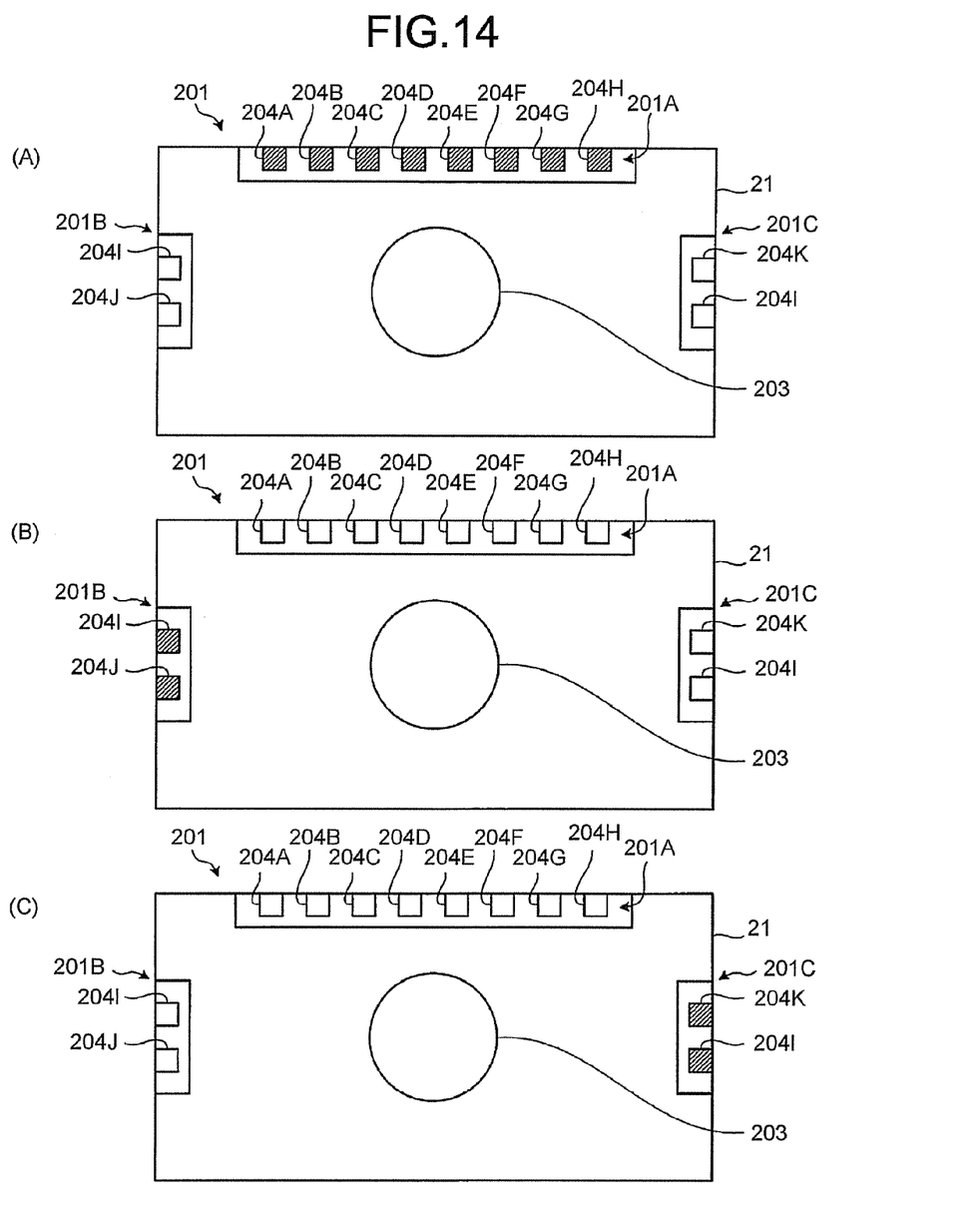
FIG. 14 is a diagram showing the example of the lighting migration of the illumination unit according to the second embodiment.

First, the illumination control unit 403 only turns on the upper light source unit 201a (Act S601). At this time, the left light source unit 201b and the right light source unit 201c are turned off. Then, the illumination control unit 403 turns on the left light source unit 201b (Act S602). At this time, the upper light source unit 201a and the right light source unit 201c are turned off. Sequentially, the illumination control unit 403 turns on the right light source unit 201c (Act S603). At this time, the upper light source unit 201a and the left light source unit 201b are turned off. Further, the illumination control unit 403 returns to carry out the processing above repeatedly, starting from Act S601. The turning-on operations in Acts S601-S603 are synchronous in time with the image pickup of the image pickup element 203. That is, the light outgoing position (irradiation condition) of the illumination unit 201 is changed in accordance with the image pickup timing of the image pickup element 203. Thus, the image pickup element 203 shoots an image using the lights irradiated from different positions in Acts S601-S603. Turned on illumination units 201 are changed in the order shown in FIG. 14(a)-FIG. 14(c). In this way, the illumination control unit 403 can change turned on LEDs 204 continuously in this embodiment, regardless of whether or not blown-out highlights occur.

As stated above, in this embodiment, the illumination control unit 403 changes turned on LEDs 204 continuously. Thus, like in the first embodiment, in this embodiment, the occurrence or position of blown-out highlights can be inhibited or changed to prevent the barcode 209 in the image from suffering blown-out highlights, thereby preventing a defective picked-up image of the barcode 209.

Further, the program executed by the image identification apparatus 2 in this embodiment is pre-compiled in an ROM. However, the present invention is not limited to this, for instance, the program executed by the image identification apparatus 2 in this embodiment may be stored in a computer-readable memory medium such as CD-ROM, floppy drive (FD), CD-R, digital versatile disk (DVD) as an installable or executable file, or stored in a computer connected with a network such as the Internet to be provided through a network download, or provided or published by a network such as the Internet.

In addition, although it is illustrated in the foregoing embodiments an example in which the light outgoing position of an illumination unit is changed by changing turned on light sources using an illumination control unit, the present invention is not limited to this, for instance, it can also be constructed that a light source position, that is, a light outgoing position, is changed by moving a light source that can move around a image pickup element around the image pickup element using a drive source that drives the light source and is driven by an illumination control unit.

In conclusion, in accordance with the embodiments described above, the image identification apparatus provided herein can prevent a defective image pickup of an identified object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image identification apparatus, comprising:
an image pickup unit configured to pickup an image of an identified object;
an illumination unit configured to irradiate light towards an image pickup area of the image pickup unit;
an illumination control unit configured to change an irradiation condition of the illumination unit in accordance with an image pickup timing of the image pickup unit; and
an identification unit configured to identify the identified object according to the image picked-up by the image pickup unit, wherein
the illumination unit includes a plurality of light sources,
when the illumination control unit turns on all of the light sources and the number of white image pixels contained in an acquired image is greater than a first predetermined value, the illumination control unit is configured to reduce the number of the turned on light sources,
when the number of the turned on light sources is reduced and the number of white image pixels contained in an acquired image is greater than a second predetermined value, the illumination control unit is configured to change the turned on light sources in a state that the number of the turned on light sources is reduced, and
when the number of white image pixels contained in an acquired image is greater than a third predetermined value in a state that the number of the turned on light sources is reduced and the turned on light sources are changed, the illumination control unit is configured to further reduce the number of the turned on light sources.

2. An image identification method in an image identification apparatus having an image pickup unit configured to pickup an image of an identified object, an illumination unit, comprising a plurality of light sources, configured to irradiate light towards an image pickup area of the image pickup unit and an identification unit configured to identify the identified object according to the image picked-up by the image pickup unit, comprising:
changing an irradiation condition of the illumination unit in accordance with an image pickup timing of the image pickup unit;
reducing, in response to all of the light sources being turned on and the number of white image pixels contained in an acquired image being greater than a first predetermined value, the number of the turned on light sources;
changing, in response to the number of the turned on light sources being reduced and the number of white image pixels contained in an acquired image being greater than a second predetermined value, the turned on light sources in a state that the number of the turned on light sources is reduced; and
altering, in response to the number of white image pixels contained in an acquired image being greater than a third predetermined value in a state that the number of the turned on light sources is reduced and the turned on light sources are changed, the number of the turned on light sources to a reduce quantity.

* * * * *